United States Patent [19]

Irwin

[11] Patent Number: 5,334,693
[45] Date of Patent: Aug. 2, 1994

[54] ARAMID COMPOSITION

[75] Inventor: Robert S. Irwin, Wilmington, Del.

[73] Assignee: E. I. Du Pont de Nemours and Company, Wilmington, Del.

[21] Appl. No.: 65,970

[22] Filed: May 21, 1993

[51] Int. Cl.$^5$ ............................................. C08G 69/26
[52] U.S. Cl. .................... 528/185; 528/338; 528/339; 528/340; 528/344; 528/348; 428/474.4; 428/395
[58] Field of Search ............... 528/185, 340, 348, 338, 528/339, 344; 428/474.4, 395

[56] References Cited

U.S. PATENT DOCUMENTS 4,217,227 8/1980 Elfert et al. ...................... 210/500
4,239,880 12/1980 Darms ................................ 528/125

FOREIGN PATENT DOCUMENTS 3-31324 2/1991 Japan .

Primary Examiner—John Kight, III
Assistant Examiner—P. Hampton-Hightower
Attorney, Agent, or Firm—Susan Borden Evans

[57] ABSTRACT

Aramids having repeat units derived from p-phenylenediamine, 4,4'-bis(3-aminophenoxy)biphenyl and terephthalic acid. These aramids have good strength properties, particularly after drawing, and good high temperature properties. The aramids are useful for fibers and films.

11 Claims, No Drawings

ARAMID COMPOSITION

FIELD OF THE INVENTION

This invention involves an aramid with repeat units derived from 4,4'-bis (3-aminophenoxy) biphenyl, p-phenylenediamine and terephthalic acid. Such aramids have excellent physical and high temperature properties when used as fiber or films.

TECHNICAL BACKGROUND

Aramids, particularly those that form lyotropic solutions or can be spun as anisotropic melts, have exceptionally good tensile modulus, but sometimes have somewhat low tensile strengths and even lower elongations. The lower elongations and tensile strengths mean these aramids have relatively low toughness. These aramids also often have very good high temperature properties. One goal in aramid technology is to develop aramids which have relatively high moduli, tensile strength and elongation, while maintaining good high temperature properties.

The aramids described herein have such a combination of properties. They are made from repeat units formally derived from 4,4 '-bis (3-aminophenoxy)biphenyl, p-phenylenediamine and terephthalic acid.

U.S. Pat. No. 4,217,227 generically describes a variety of aramids in which the portion derived from the diamine has multiple phenyl rings present. Such generic formulas could include 4,4 '-bis (3-aminophenoxy)-biphenyl, but this compound is not specifically mentioned. These aramids are said to be useful for semipermeable membranes.

Japanese Patent Application 3-31324 describes an aramid containing repeat units derived from 4,4 '-bis (3-aminophenoxy)biphenyl and terephthalic acid. These aramids have relatively poor high temperature properties, with glass transition temperatures well below 300° C., and melting below about 350° C. No mention is made of the presence of repeat units derived from p-phenylenediamine in this aramid.

SUMMARY OF THE INVENTION

This invention concerns an aramid, consisting essentially of repeat units of 20 to 80 mole percent of a first unit of the formula pehylenediamine is commercially available. As can be readily seen, the ratio of repeat units is determined by the ratio of these diamines in the aramid. A preferred molar percentage of the first repeat unit is 25 to 75 percent, more preferably 35 to 65 percent.

By the aramid "comprising" is meant that the aramid may contain other materials as blends (not as repeat units), such as fillers, colorants, reinforcers, antioxidants, etc. By the repeat units "consisting essentially of" is meant the recited repeat units plus normal impurities, small amounts of other repeat units which don't change the essential properties of the aramid, end groups, etc. Therefore, if the first repeat units are a certain percentage of the polymer, the second repeat units will be the remainder (or nearly so) of the repeat units.

Up to 10 mole percent (total of all "other" repeat units), preferably up to 5 mole percent, of the repeat units herein may derived from compounds other than p-phenylenediamine, 4,4'-his (3-aminophenoxy)biphenyl, and terephthalic acid. Useful repeat units include those derived from 4,4'-bibenzoic acid, 2,6-naphthalene dicarboxylic acid, and monosubstituted p-phenylenediamine. The monosubstituted p-phenylenediamine is substituted on the ring, and suitable substituents include halogen, alkyl containing 1-6 carbon atoms and phenyl. These other repeat units can be present only if the essential character of the aramid is not changed.

The aramids can be made by methods known to the artisan, for instance react ion of terephthaloyl chloride with the diamines in solution (see Examples 1-4). See also H. Mark, et al., Ed., Encyclopedia of Polymer Science and Engineering, 2nd Ed., vol. 11, John Wiley & Sons, New York, p. 394–405 (1988). It is preferred if the molecular weight of the polymer is high enough so that the polymer is fiber forming.

The aramids described herein have good high temperature properties, as indicated by the temperature at which melting is indicated, at least about 500 ° C. Their excellent high temperature stability also allows fibers to be drawn at temperatures well above 300 ° C. Drawing also markedly increases the tensile strength and modulus, while maintaining reasonable elongations of 3% or more. The higher melting temperature of the present aramids means that their fibers can be drawn to a higher degree than lower melting aramids, which usually results in fibers with better physical properties. The ara-

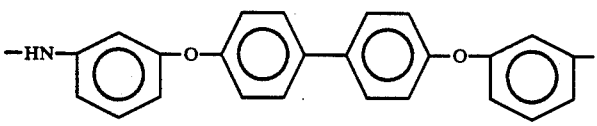

and a second unit of the formula

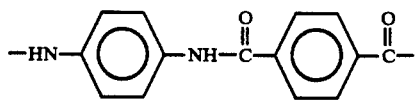

DETAILS OF THE INVENTION

Two diamines are used herein along with terephthalic acid (or a reactive equivalent of each) to make the repeat units of the instant aramid. One of these diamines, 4,4'-bis(3-aminophenoxy)biphenyl, can be made according to European Patent Application 192,480, while p- mids described herein are useful as fibers, as in ropes and composites, and as films.

In the Examples, the following abbreviations are used:

BAPB—4,4'-bis (3-aminophenoxy)biphenyl
DMAc—N,N-dimethylacetamide
DSC—differential scanning calorimetry
E—percent tensile elongation to break
gpd—grams per denier
Mi—initial tensile modulus
NMP—N-methylpyrrolidone
PPD—p-phenylenediamine
T—tensile strength at break
TGA—thermogravimetric analysis Methods of measuring tensile properties, Apparent Crystallite Size and Orientation Angle are described in commonly assigned U.S. application Ser. No. 07/748,346, filed Oct. 29, 1991, now U.S. Pat. No. 5,212,258, which is hereby included by reference.

EXAMPLE 1

Polymerization

BAPB (5.005 g; 0.0136 mole) and PPD (1.469 g; 0.0136 mole), dissolved in anhydrous N-methylpyrrolidone (88 g; 85.4 mL) containing anhydrous $CaCl_2$ (3.0 g; 0.0272 mole), with stirring, at 10° C., under a dry nitrogen atmosphere, were treated with terephthaloyl chloride (5.522 g; 0.0272 mole). After several hours stirring, CaO (1.52 g; 0.0272 mole) was added to the viscous yellow solution to neutralize the HCl by-product. $\eta_{inh} = 2.27$ (in NMP).

Film

The above solution was cast as a film on a clear, glass plate using a 0.51 mm doctor's knife, dried overnight at 80° C. in a forced air oven, soaked in water 4 hr at 21° C. to remove $CaCl_2$, then clamped at the edges to prevent shrinkage and redried 14 hr/80° C. The clear, straw-colored film was divided into 0.64 cm strips which were then stretched by hand across a neared metal plate (circular; 2.54 cm diameter; about 2.54 cm contact length) as shown in Table 1, which shows also tensile and wide-angle X-ray properties.

TABLE 1

Properties of Drawn Films of Example 1

| DRAWING | | TENSILE PROPERTIES* | | | | Apparent Crystallite Size, Å | Orientation Angle |
|---|---|---|---|---|---|---|---|
| Temp. | % | Tenacity, gpd | Elong., % | Modulus, gpd | Denier | | |
| As Cast | | 1.0(1.1) | 79(95) | 29(31) | 2465(2674) | 0 | — |
| 300° C. | 225% | — | — | — | — | 10.9 | 63° |
| 350° | 500 | 10.0(10.6) | 5.7(5.9) | 253(268) | 564(495) | — | — |
| 375° | 650 | 10.3(11.7) | 5.3(5.2) | 253(280) | 487(420) | — | — |
| 400° | 775 | 8.0(10.7) | 3.4(4.2) | 276(308) | 293(308) | 36.7 | 9.2° |
| 425° | 1300 | 7.5(10.1) | 3.1(3.9) | 259(306) | 257(243) | 44.5, 46.2 | 7.4°, 8.0° |
| 475° | Melting | — | — | — | — | — | — |

*Average of 5 replicates. Highest single tenacity in parentheses.

EXAMPLE 2

Polymerization

A solution of BAPB (15.04 g; 0.041 mole) and PPD (6.62 g; 0.061 mole) in NMP (308 g; 299 mL) containing anhydrous $CaCl_2$ (10.5 g; 0.095 mole) was treated with terephthaloyl chloride (20.75 g; 0.102 mole) as in Example 1. The resulting polymer solution was neutralized with CaO (5.32 g; 0.095 mole) after dilution from 9.7% to 3.4% polymer solids to form a viscous, flowable solution, by addition of a total of 657 g additional NMP. This had $\eta_{inh} = 3.04$ in NMP and 1.99 in sulfuric acid.

Fibers

The above solution was extruded at 52° C. at 17 m/min through a single hole spinneret of diameter 0.15 nun and length 0.46 nun via an air gap into (a) 20/80 and (b) 40/60 v/v $NMP/H_2O$ at 21° C. and fiber of 7-10 den/fil wound up at 17 m/min, i.e., a spin-stretch factor of about 1. All fibers under all conditions were opaque, i.e., voided. They were soaked several hours in water to extract salts and allowed to dry in air. They were rather weak as a result of poor consolidation related to very low dope concentration. This severely restricted drawability over a hot plate to 300% at 330° C. As-spun T/E/Mi were about 1.2 gpd/7.6%/57 gpd and increased to a maximum of 3.6 gpd/2.7%/185 gpd on stretching 275% at 300° C.

Dry spinning was unsuccessful because of (a) the very low solution concentration and (b) high b.p. NMP.

Films

Films were cast and drawn as in Example 1, using a 0.76 mm doctor's knife. These were clear and well consolidated. As-spun T/E/Mi were 1.1 gpd/90%/23 gpd. Films could be drawn 830% at 375° C. though best properties, 12.2 gpd/4.6%/3.4 gpd at 260 dpf resulted from 630% draw at 300° C.

EXAMPLE 3

Example 1 was repeated using DMAc in place of NMP at 9.6% solids and $\eta_{inh} = 1.65$ in DMAc. The bulk viscosity was too low for dry spinning so films were cast with 0.51 mm and 0.76 nun doctor's knives and assessed as in Example 1. Drawing was possible up to a maximum temperature of 475° C. and 1600% stretching. Ascast films had T/E/Mi/denier of 1.0 gpd/79%/27 dpf increasing to 10.9/5.0/240 (average) and 11.9/5.8/244 (highest tenacity) on stretching 770% at 375° C. TGA showed incipient rapid weight loss at about 440° C.

EXAMPLE 4

Using well-dried DMAc, Example 3 was repeated to provide a 10% solution of the polymer of $\eta inh = 2.80$ (in DMAc).

The solution was passed through a heat-exchanger at 126° C. at 140 psi, through a spinneret pack containing a combination of wire mesh screens to filter out fine particulate impurities, and extruded through a 10-hole spinneret with hole diameter 0.17 mm and length 0.25 mm, at 120 m/min into a cocurrent of nitrogen heated at 230°-250° C. into a heated cell heated at 200° C. Nitrogen flow pressure was measured as 3.4" water. Fibers were wound up at 130 m/min onto bobbins which were immersed in water overnight to extract salts and residual solvent.

The air-dried fibers were passed via 10 wraps at 4.0 m/min across a roll heated at 102° C., drawn across a hot pin at various temperatures in the range 450°-550° C. at various draw ratios and via 7 wraps across a metering roll at 21° C., to a wind-up. Tensile properties are shown in Table 2.

TABLE 2

| Drawing Temp. | % | Denier per Fil. | T, gpd | E, % | Mi, gpd |
|---|---|---|---|---|---|
| As-Spun | | 8.4 (8.9) | 2.0(2.7) | 149(197) | 16.7(24) |
| 476° C. | 500 | 1.5 | 13.0(14.1) | 4.9(5.2) | 383(420) |
| 546° | 800 | 1.3 | 7.6(12.3) | 3.8(4.7) | 267(355) |
| 569° | 1000 | 1.0 | 7.7(10.8) | 3.6(5.9) | 284(287) |

Properties of Drawn Fibers of Example 4

What is claimed is:

1. An aramid, consisting essentially of repeat units of 20 to 80 mole percent of a first unit of the formula

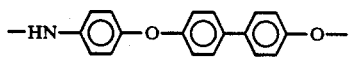

and a second unit of the formula

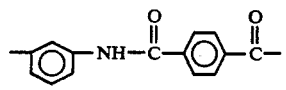

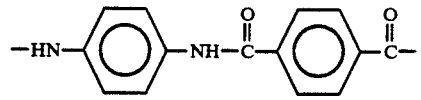

2. The aramid as recited in claim 1 wherein said first unit is 25 to 75 mole percent of said repeat units.
3. A fiber of the aramid of claim 1.
4. A fiber of the aramid as recited in claim 2.
5. A film of the aramid as recited in claim 2.
6. A film of the aramid as recited in claim 1.
7. The aramid as recited in claim 2 wherein said first unit is 35 to 65 mole percent of said repeat units.
8. The aramid as recited in claim 1 additionally consisting essentially of aramid forming units other than p-phenylenediamine, 4,4'-bis(3-aminophenoxy)biphenyl, and terephthalic acid in an amount up to 10 mole percent.
9. The aramid as recited in claim 8 additionally consisting essentially of aramid forming units other than p-phenylenediamine, 4,4'-bis(3-aminophenoxy)biphenyl, and terephthalic acid in an amount up to 5 mole percent.
10. The aramid as recited in claim 1 additionally consisting essentially of aramid forming units from 4,4'-bibenzoic acid, 2,6-naphthalene dicarboxylic acid, or a monosubstituted p-phenylenediamine in an amount up to 10 mole percent.
11. The aramid was recited in claim 10 wherein said amount is up to 5 mole percent.